United States Patent
Tai et al.

(10) Patent No.: US 10,289,317 B2
(45) Date of Patent: May 14, 2019

(54) MEMORY APPARATUS AND METHODS THEREOF FOR WRITE AMPLIFICATION AWARE WEAR LEVELING

(71) Applicant: Western Digital Technologies, Inc., San Jose, CA (US)

(72) Inventors: Ming-Yu Tai, Irvine, CA (US); Subhash Balakrishna Pillai, Irvine, CA (US); Yung-Li Ji, Santa Ana, CA (US); Haining Liu, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/396,548

(22) Filed: Dec. 31, 2016

(65) Prior Publication Data
US 2018/0188980 A1    Jul. 5, 2018

(51) Int. Cl.
*G06F 3/06* (2006.01)
*G06F 12/02* (2006.01)

(52) U.S. Cl.
CPC .......... *G06F 3/0616* (2013.01); *G06F 3/064* (2013.01); *G06F 3/0614* (2013.01); *G06F 3/0659* (2013.01); *G06F 3/0679* (2013.01); *G06F 12/0246* (2013.01); *G06F 2212/1036* (2013.01); *G06F 2212/7202* (2013.01); *G06F 2212/7205* (2013.01); *G06F 2212/7211* (2013.01)

(58) Field of Classification Search
CPC .... G06F 3/0614; G06F 3/0616; G06F 3/0652; G06F 3/0679

USPC ........................................................ 711/103
See application file for complete search history.

(56) References Cited

U.S. PATENT DOCUMENTS

| | | | |
|---|---|---|---|
| 5,485,595 A | 1/1996 | Assar et al. | |
| 6,000,006 A | 12/1999 | Bruce et al. | |
| 2012/0317337 A1* | 12/2012 | Johar | G06F 12/0246 711/103 |
| 2014/0365719 A1* | 12/2014 | Kuzmin | G06F 12/0246 711/103 |
| 2014/0369124 A1* | 12/2014 | Moon | G11C 16/16 365/185.11 |
| 2016/0162205 A1* | 6/2016 | Grimsrud | G06F 3/0616 711/103 |
| 2017/0242583 A1* | 8/2017 | Yang | G06F 3/061 |
| 2017/0242790 A1* | 8/2017 | O'Krafka | G06F 3/0604 |

(Continued)

OTHER PUBLICATIONS

Brian Dipert & Markus Levy; "Desingin with Flash Memory"; Annabooks, San Diego; 1994; pp. 38-44, 65-67, 227-271.

*Primary Examiner* — Than Nguyen
(74) *Attorney, Agent, or Firm* — Patterson & Sheridan, LLP; Steven Versteeg

(57) ABSTRACT

A method of wear leveling receives a write request. The write request indicates received data to be written to memory blocks. The method detects a system condition. Example system conditions include a random write condition, a garbage collection start condition, and/or a sequential write condition. Based on the system condition, the method determines whether the received data comprises hot data or cold data. Some embodiments use a write amplification value to determine the system condition. If the received data comprises hot data, the method writes the received data to a cold block. If the received data comprises cold data, the method writes the received data to a hot block.

16 Claims, 6 Drawing Sheets

(56) References Cited

U.S. PATENT DOCUMENTS

2017/0322739 A1* 11/2017 Grimsrud .......... G06F 12/0246
2018/0018269 A1* 1/2018 Jannyavula Venkata ..................
                                                G06F 12/0888

* cited by examiner

US 10,289,317 B2

MEMORY APPARATUS AND METHODS THEREOF FOR WRITE AMPLIFICATION AWARE WEAR LEVELING

FIELD

The embodiments of the disclosure relate generally to wear leveling when writing data in a non-volatile memory system.

BACKGROUND

A non-volatile memory device (e.g., a solid state drive, a flash memory integrated circuit device, and the like) is organized as sets of read-writable pages along a plurality of word lines. Each page in a non-volatile memory device includes a plurality of electrically erasable programmable read only memory cells, also referred to as read-writeable non-volatile memory. There are multiple read-writeable pages of non-volatile memory grouped into each word line of a non-volatile memory device. In some cases, a memory block includes about 256 read-writeable pages.

Repeatedly erasing and writing data by programming blocks of data can slowly cause wear on electrically erasable programmable read only memory cells as the write count becomes large. An electrically erasable programmable read only memory cell may lose the ability to be programmed or retain a charge representing the stored data. Bit errors can occur when the number of erase/write cycles becomes great. Accordingly, it is desirable to extend the life time of read-writeable non-volatile memory by evening out the number of erase/write cycles over a plurality of blocks of electrically erasable programmable read only memory cells.

SUMMARY

Aspects of embodiments of the disclosure are summarized by the claims that follow below. In general, the disclosed embodiments distribute write operations among the memory blocks of a non-volatile memory system to achieve efficient wear leveling for the memory system.

DETAILED DESCRIPTION

In the following detailed description of the embodiments, numerous specific details are set forth in order to provide a thorough understanding of the embodiments of the disclosure. However, it will be obvious to one skilled in the art that the embodiments of the disclosure may be practiced without these specific details. In other instances well known methods, procedures, components, and circuits have not been described in detail so as not to unnecessarily obscure aspects of the embodiments of the disclosure.

Non-volatile memory integrated circuits possess characteristics that allow them to augment, and in some cases replace dynamic random access memory (DRAM) and storage disks in a storage subsystem of a computer system. Some types of non-volatile memory circuits, such as NAND Flash integrated circuits, can be configured as storage devices that offer disk-like non-volatility and capacity, with DRAM-like read and write access performance. Delivering the same performance, some types of non-volatile memory circuits may utilize less space and consume less power.

Non-volatile memory circuits can be manufactured into a hardware device for use with a host computer system. One example of such a hardware device is a flash drive. Reliability is important in a non-volatile memory device. Important user data is often written into non-volatile memory devices. Users have expectations that data previously written into a non-volatile memory device can be reliably written to and read out from the device, even after a planned or unplanned loss of power, and even after extended use over a period of time.

Figure 1:
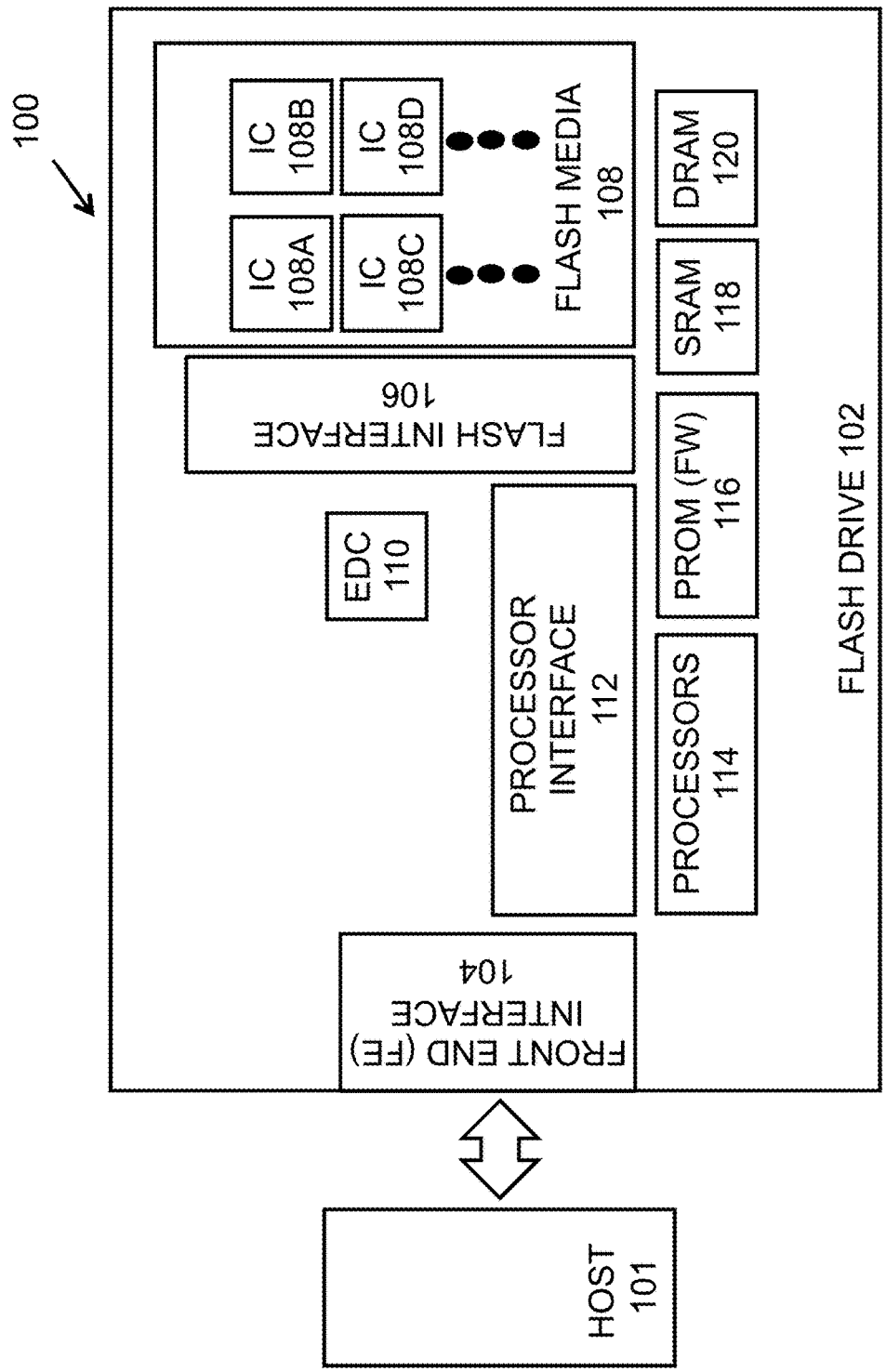
FIG. 1 illustrates a host operationally coupled to a flash drive.

FIG. 1 illustrates such a system 100 having a host 101 operationally coupled to a flash drive 102. As shown in this figure, the flash drive 102 includes a front end (FE) interface 104 for coupling to the host 101 and receiving write requests from the host 101. One of ordinary skill recognizes a variety of implementations and protocols for the front end interface 104 such as, for example, SATA, NVMe, SCSI, and SAS, among others. The flash drive 102 also includes flash media 108 having a plurality of flash memory integrated circuits (ICs or chips) 108A, 108B, 108C and 108D, and so on.

The flash memory chips 108A, 108B, 108C and 108D include physical memory blocks that are typically organized into a set of read/writeable logical memory blocks that are used to store data for the host 101. The flash media 108 is implemented by using NAND-type integrated circuits, NOR-type integrated circuits, a combination thereof, or another type of suitable integrated circuit for implementing the flash media 108. One of ordinary skill recognizes that the exemplary flash memory chips 108A, 108B, 108C and 108D are illustrative of implementations that include small and/or large numbers of chips of various numbers of transistors and memory cells such as, for example, up to terabyte capacities or above.

To write data efficiently, the flash memory chips in the flash media 108 are erased at a granularity of a data block. A data block is a sequence of memory cells addressable together having a block size of storage capacity of data bits. The size of a data block can vary depending upon the type of flash memory (e.g., NAND flash memory or NOR flash memory) and the semiconductor manufacturing geometries available (e.g., sub-micron channel lengths) to make the flash memory cells. For example, in one flash memory device one data block can be 4 kilobytes with 8 pages of 512 bytes. In another more dense flash memory device, one data block can be 4 megabytes with 256 pages of 16 kilobytes. One byte of data is typically defined to be 8 bits of data.

After erasing a data block, data can be written at the granularity of the data block or smaller granularity, such as a page within the data block. Data can be read out from the flash memory chips in the flash media 108 by the data block, the page, or at an even a smaller granularity of the data block, such as a byte or a word, for example.

Within the host 101, application software and/or operating system software may be executed by one or more processors and issue block memory access requests to driver software to read or write blocks of data within main memory. The driver software may aggregate a number of block memory access requests from application software and/or operating system software into sets of one or more block memory access requests against master memory controllers.

The application or operating system software includes instructions that when executed by a processor issues block memory access requests. The driver software includes instructions that when executed by a processor provide an operations scheduler to receive the block memory access requests. The driver software issues read, write, and erase operations to the flash media 108 coupled to memory channels in response to the block memory access requests. The operation of the driver software to schedule read and write operations is in part responsive to the application software or operating system making block memory access requests.

The flash drive 102 further includes one or more processors 114 for processing the write requests by using the flash media 108, static random access memory (SRAM) 118, dynamic random access memory (DRAM) 120, an error detect and correct (EDC) module 110, and firmware 116. The firmware 116 is implemented in one or more forms of programmable read only memory (PROM) such as erasable programmable read only memory (EPROM) and/or electrically erasable programmable read only memory (EEPROM), as examples.

The firmware 116 can store instructions for the processors 114 such that when coupled to the host 101, the flash drive 102 is capable of detecting a condition in the system 100 to determine whether data for a write operation into flash memory comprises hot data or cold data. Generally, hot data is data that is expected to be frequently updated and used. Hot data can be user data for example, such as a phone or contact list, or system data for example, such as an operational log file. Generally, cold data is data that is not expected to be frequently (infrequently) updated or used. Cold data for example can be operating system software or application software. One method of detecting the system condition is by detecting the host 101 behavior. In an aspect of the embodiments, this capability is important for the drive 102 because it allows the drive 102 to write hot data to cold memory blocks thereby distributing the write operations efficiently among the memory blocks of the flash media 108. This capability further allows the drive 102 to write cold data to hot memory blocks.

One of ordinary skill recognizes that the flash drive 102 is representative of a variety of hardware devices that may incorporate the embodiments disclosed herein, and that reliability is important to the system 100.

General Operation of a Memory System

Within the host 101, application software and/or operating system software may be executed by one or more processors and issue block memory access requests to driver software to read or write blocks of data within main memory. The driver software may aggregate a number of block memory access requests from application software and/or operating system software into sets of one or more block memory access requests against master memory controllers.

The application or operating system software includes instructions that when executed by a processor issues block memory access requests. The driver software includes instructions that when executed by a processor provide an operations scheduler to receive the block memory access requests. The driver software issues read, write, and erase operations to the flash media 108 coupled to memory channels in response to the block memory access requests. The operation of the driver software to schedule read and write operations is in part responsive to the application software or operating system making block memory access requests. The operation of the driver software to schedule read, write and erase operations is further responsive to garbage collection activity with the flash media 108. Garbage collection is a service provided for the flash drive 102 to reclaim unused or invalid memory locations in the flash media 108 that include fragments of unused data or store invalid data.

Garbage collection recovers memory space for writes to the flash media 108 and may be activated for a number of reasons. Garbage collection may be activated when a ratio of presently used capacity to available capacity exceeds a first threshold and deactivated when the ratio falls below a second threshold different from the first. Alternatively or conjunctively, garbage collection may be activated for regions of memory locations in the flash media that exceed a predetermined time limit of last access. If garbage collection is inactive, read operations, write operations, and erase operations may be selected to limit the impact of write and erase operations on read operations. Alternatively if garbage collection is inactive, the operations that access flash media may be selected to limit the impact on read latencies for read operations and to limit the impact on write latencies for write operations. If garbage collection is active, flash media access operations may be selected to match a rate of freeing capacity by the garbage collection activity to a rate of consumption of capacity by the application workload. The read, write, and erase operations correspond to application data requests, metadata requests, and garbage collection requests. Application data requests are block memory access requests made by the application software. Metadata requests are requests to store translations between a logical block number in a block device view and a physical block address identifying a unique memory block in the flash media 108. Garbage collection requests correspond to operations issued by the driver software to reclaim unused or invalid memory capacity in the flash media 108.

Application data requests and metadata requests are stored in a high priority queue of an operations queue. Garbage collection requests are stored in a low priority queue of the operations queue. The driver software may provide fairness in execution of high and lower priority operations. For instance, the driver software monitors the number of outstanding high and lower priority operations in the high and low priority queues. In response to the number of outstanding low priority operations reaching a predetermined threshold, the driver software may throttle down the execution of the high priority operations in the high priority queue so that outstanding low priority operations are executed.

At its level, the operation scheduler is responsible for making progress on three types of operations (read, write, erase), in a fashion that allows overall progress on the workload of interest; making sure that low-latency operations such as reads do not end up getting queued behind longer-latency operations such as erases; making sure that the mixing of requests from application block requests, meta-data requests, and garbage collection requests are handled appropriately; and managing power consumption. Reads, writes, and erases consume different power, so the operation scheduler can control overall power consumption by controlling how many of each of these operations are active at a time.

For example, in response to a set of one or more block memory access requests, the driver software schedules read operations, write operations, and erase operations. The number of each type of operation is responsive to the work load required by the application or operating system software. The number of each type of operation may be a function of the read to write ratio of the application workload requests and whether or not garbage collection is active with the flash media 108.

Within this disclosure, hot data is data that is frequently updated, and cold data is data that is not as frequently updated or used. A hot block is a memory block that has a high erase count, and a cold block is a memory block with a low erase count. Some implementations of the flash drive 102 determine an average erase count for some or all of the blocks and determine whether a particular block has a high erase count by calculating the erase count for that block and comparing the calculated erase count for the particular block to the average erase count for set of blocks. For instance, if a particular block has a higher erase count than the average erase count, then that block is a hot block. If the erase count for a block is lower than the average erase count for the set of blocks, then that block is a cold block. The average erase count may advantageously be stored as a global system variable available for use in multiple comparisons at different times. Hence, these implementations save resources by not maintaining and storing an erase count for every block at all times.

In an implementation, one or more erase counts and/or average erase counts are stored and retrieved when needed in the DRAM 120 of FIG. 1. In a particular implementation, firmware in the PROM 116 determines which blocks are hot blocks and which blocks are cold blocks at various times. The firmware may use one or more of the processors 114 to make the determination. The firmware of these implementations maintains a linked-list for identifying the hot blocks and a linked-list for identifying the cold blocks. Erase count is one measure of the frequency of use and/or the level of wear upon each memory block, and linked-lists are one manner of identifying hot blocks and cold blocks for writing. A process for identifying and selecting hot blocks and/or cold blocks is described below in relation to FIG. 6. Other measures are contemplated to track approximate wear levels, and to identify hot blocks and cold blocks.

Erase count and average erase count are important because flash memory including NAND-type flash memory has endurance problems. As the flash memory ages, and with use, the underlying circuitry degrades until it eventually fails to reliably hold data. One indicator of memory degradation is increasing bit error rate (BER). Higher usage of some but not all memory blocks causes faster degradation of not only the over-used blocks, but also causes reliability problems for the other memory blocks. Stated differently, writing hot data to a hot block and/or writing cold data to a cold block has a number of undesirable effects such as, for example, excessive write and/or erase operations, increasing bit error rate, and premature degradation and failure of the system 100 and/or the drive 102. In view of the foregoing, some embodiments use a novel and useful mechanism to keep the erase count substantially similar for each block of the flash media 108.

Figure 2:
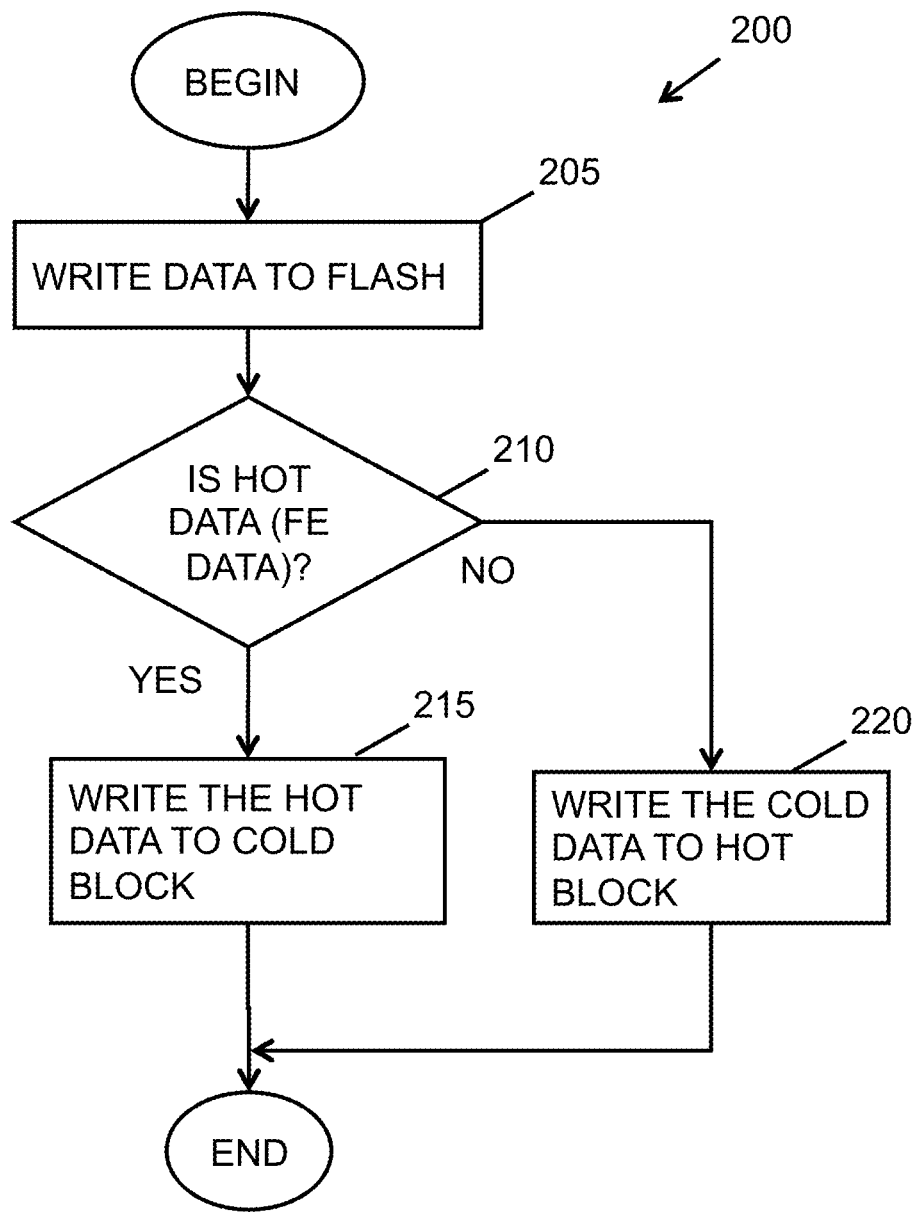
FIG. 2 illustrates a process for wear leveling according to an implementation.

FIG. 2 illustrates a process 200 for wear leveling designed to improve reliability for the system 100 of FIG. 1. As shown in FIG. 2, the process 200 begins at step 205 where a request to write data is received. For instance, in the implementation illustrated by FIG. 1, the host 101 sends a request to write important user data to the flash drive 102. The request to write data is received by the front end interface 104, to be processed by the processors 114, and written to a location in the flash media 108. Accordingly, once the request to write data is received at the step 205, the process 200 transitions to step 210, where the process 200 determines whether the data for writing is hot data. One example of hot data is data that is frequently or recently updated by the host, and received from the host 101 by the front end interface 104, e.g., front end (FE) data. If the data is hot data, then the process 200 transitions to step 215, where the hot data is written to one or more cold blocks. If at the step 210, the data is not hot data (e.g., cold data), then the process 200 transitions to step 220, where the cold data is written to one or more hot blocks. After the data is written to the appropriate blocks at the step 215 and the step 220, the process 200 concludes.

The foregoing process 200 functions to achieve wear leveling under certain conditions. Some embodiments further provide additional wear leveling robustness by employing advantageous techniques such as the ability to detect a system condition, to detect a host behavior, and/or by employing a write amplification awareness and applying a sensitivity to that write amplification awareness. For instance, these embodiments determine whether data to be written are for a host operation such as front end data, are for a garbage collection activity, or are part of a random write pattern. In some cases, front end data is determined to be hot data. Data from garbage collection includes cold data at various times, and further includes hot data at times. For instance, data from the start of garbage collection is determined to be cold data in particular embodiments. Data from a random write pattern is determined to be hot data in some embodiments.

Figure 3:
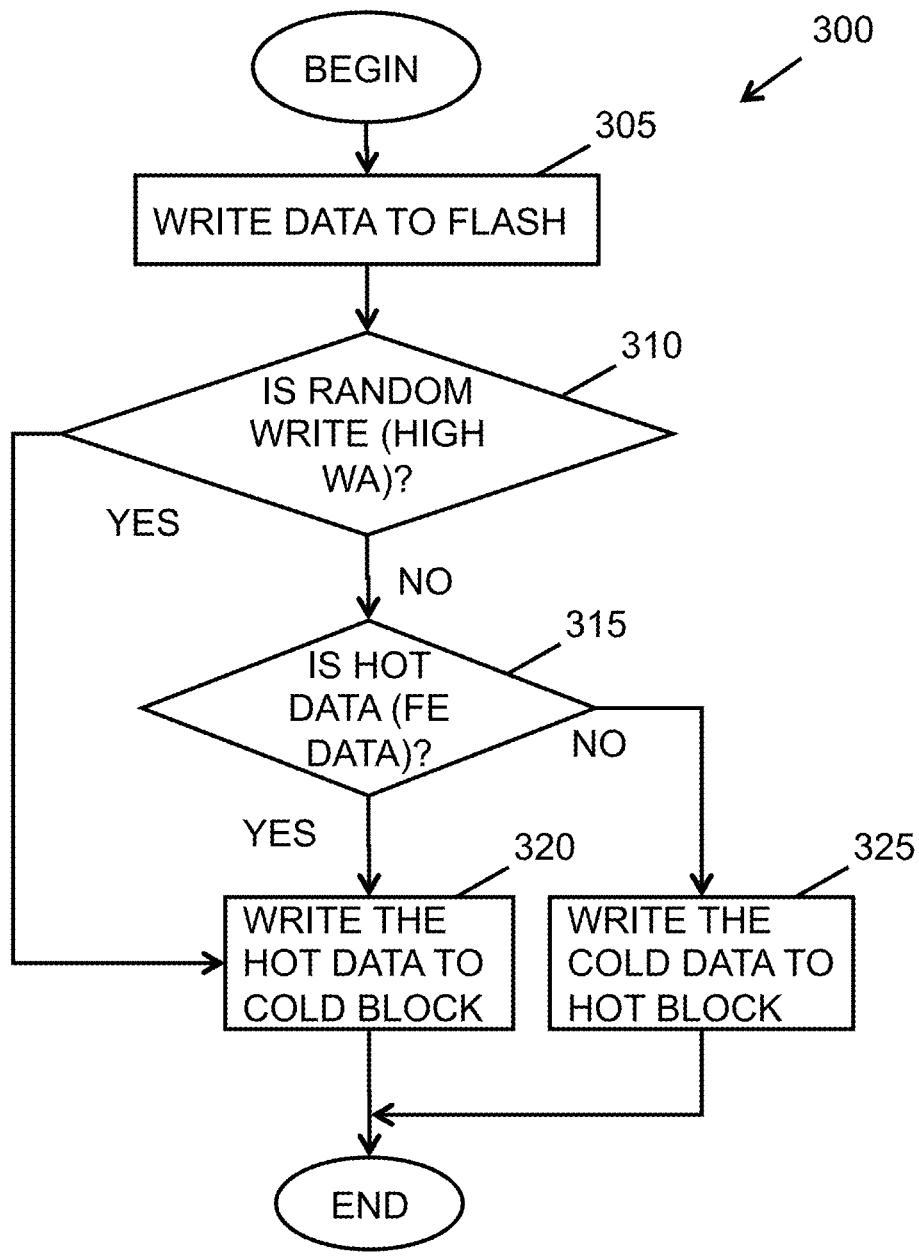
FIG. 3 illustrates a process for wear leveling in accordance with an embodiment.

For example, FIG. 3 illustrates a process 300 for wear leveling in accordance with these embodiments. As shown in this figure, the process 300 begins at the step 305, where a request to write data is received. For instance, the request is received by the flash interface 106 of FIG. 1. Once the request is received at the step 305, the process 300 transitions to the step 310, where the process 300 determines whether the write request is a random write. In some embodiments, the determination is made by detecting a system condition (e.g., by detecting host behavior) and/or by determining whether write amplification is high. Host behavior and write amplification are described further below in relation to FIGS. 4 and 5. Some embodiments use a unique and/or dedicated processor among the processors 114 of FIG. 1 to make the determination at the step 310. If a random write pattern is detected at the step 310, then the process 300 transitions to the step 320, where the hot data is written to one or more cold blocks. If at the step 310, a random write pattern is not detected and/or write amplification is not high, then the process 300 transitions to the step 315, where a determination is made whether the data is hot data. An example of hot data is data that is frequently and/or recently updated by the host, e.g. front end (FE) data. In some embodiments, a unique and/or dedicated processor (e.g., among the processors 114 of FIG. 1) is used to determine whether the data is hot data. If at the step 315 of FIG. 3 the data is determined to be hot data, then the process 300 transitions to the step 320, where the hot data is written to one or more cold blocks. If at the step 315 the data is not determined to be hot data, then the process 300 transitions to the step 325, where the cold data is written to one or more hot blocks. After the data is written to the appropriate blocks at the step 320 and at the step 325, the process 300 concludes until another request to write data is received.

Figure 4:
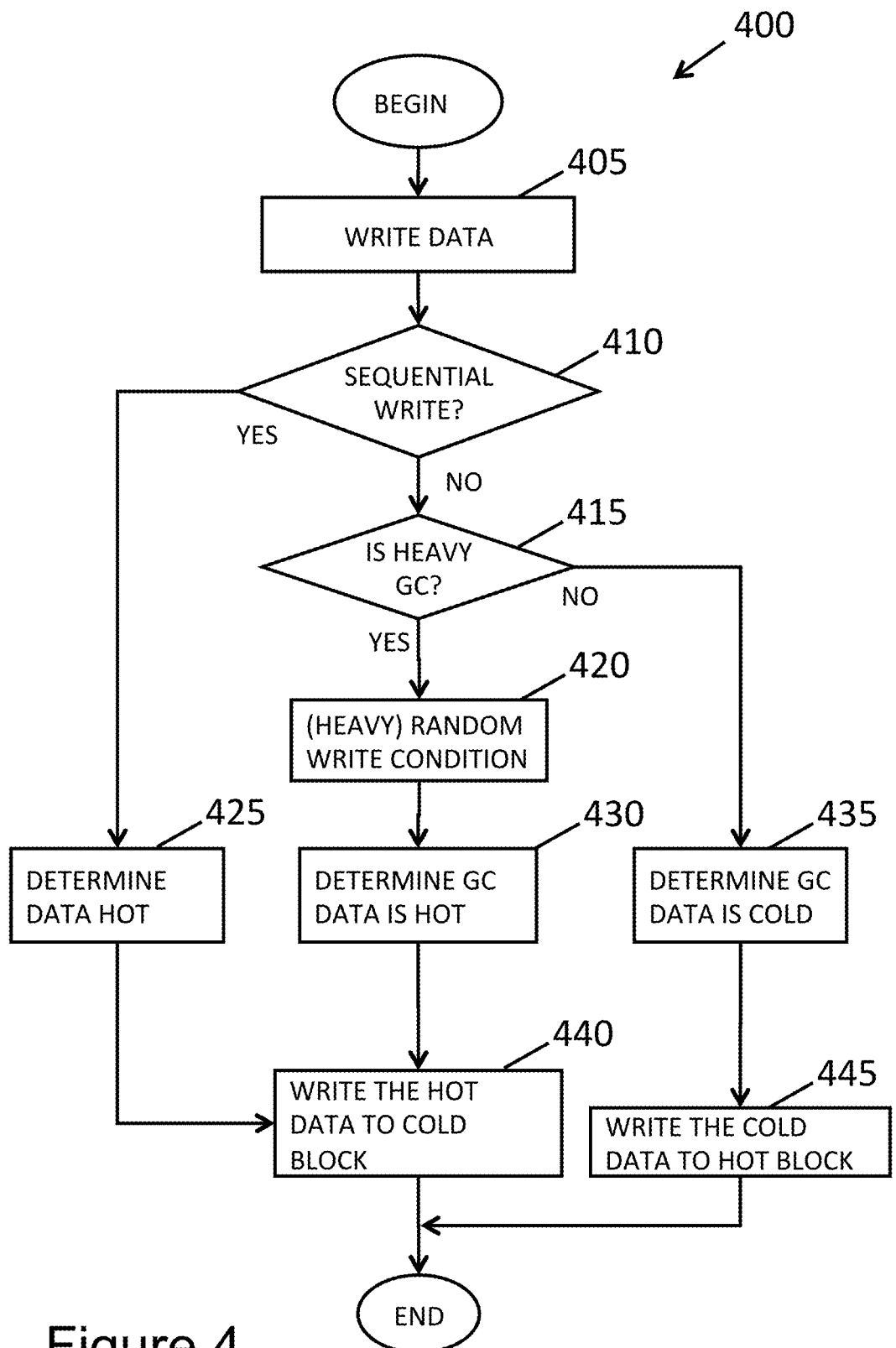
FIG. 4 illustrates a process in accordance with an embodiment.
Figure 5:
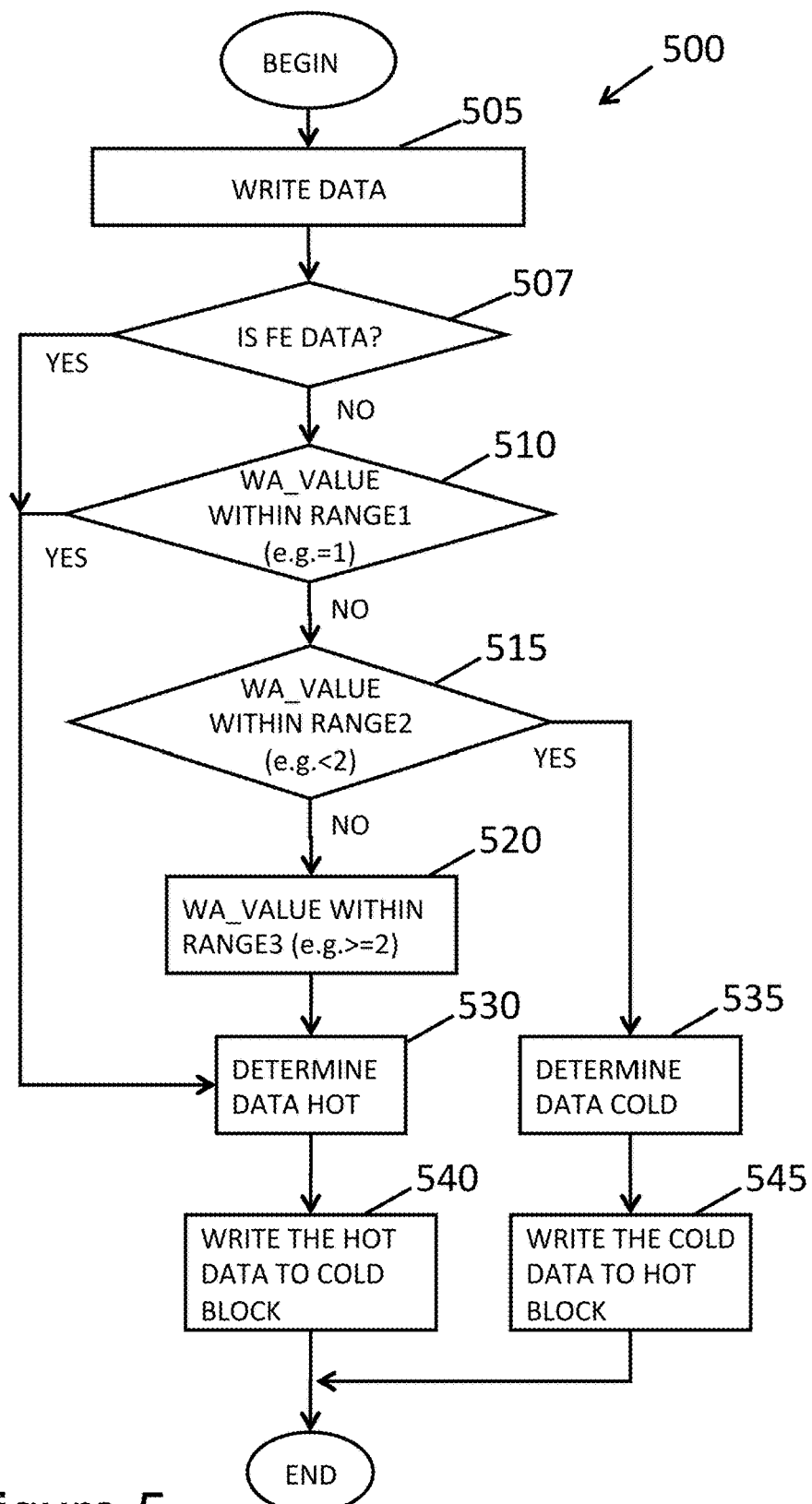
FIG. 5 illustrates an example process in accordance with an embodiment.

One of ordinary skill recognizes that alternative embodiments include variations to the embodiments disclosed herein. For instance, alternative embodiments include variations to the sequence of steps, and/or the parameters of the process 300 of FIG. 3 or the process 200 of FIG. 2. FIGS. 4 and 5 illustrate some additional example embodiments of mechanisms to improve wear leveling. Some embodiments advantageously detect the condition of the system 100 to provide intelligent wear leveling. Examples of system conditions include a sequential write condition, a garbage collection (GC) start condition, and a random write condition. An example method of detecting system condition is to detect host behavior. These examples are further described next.

Sequential Writes:

During a host sequential write condition, data from the host means the host issues a write on a logical address and the data received from the host or data received to be written for the host are typically valid and embodiments quickly determine this data to include hot data that is advantageously written to cold blocks. By writing hot data to cold blocks, these embodiments advantageously "heat up" the cold blocks by increasing the erase count of cold blocks to more closely balance to the erase count of the other blocks and/or the average erase count for the system.

Garbage Collection Start:

As previously described, when fewer blocks are available to the system for writing, the system typically begins a garbage collection process to free up blocks, e.g., to make blocks available for writing. The garbage collection of an implementation generally first selects blocks having a lowest amount of valid data because any valid data within a block needs to be written out to another location before the block can be erased and used for writing newly incoming received data. Near the start of garbage collection, data from the blocks that the garbage collector selects is typically at a logical address to which the host is unlikely to have written to for a long time. Hence, data from the start of garbage collection is determined by some embodiments to be cold data, and thus the cold data from the garbage collection start condition is advantageously written to hot blocks. In these embodiments, the cold data "cools down" the hot blocks by not undesirably increasing the erase count of hot blocks. These embodiments more closely balance of each block to the erase count of the other blocks and/or the average erase count for the system.

Random Write:

During a random write condition, every data whether valid or invalid, has a chance of being written. As a system approaches steady state, the chance of each data to be written, valid and invalid, approaches an approximately equal chance. Stated differently, a random write pattern means that every logical address has an equal chance to be written to by the host, so the access frequency of each block approaches or is approximately equal between host write data and garbage collection write data. Hence, the data from the host and/or from garbage collection during a random write condition are treated by certain embodiments as hot data and the hot data are advantageously written to cold blocks. Random write conditions may occur when the system is not performing a host sequential write, and not during the beginning of garbage collection, but instead when the system is running low on storage capacity resources (e.g., few available blocks for writes, and garbage collection has already run for an extended period of time).

Garbage collection tends to write more data than the host during a random write pattern. If the firmware writes garbage collection data to hot blocks in this case, the erase count of hot blocks undesirably increases faster than the erase count of cold blocks, which negatively impacts wear-leveling. Some embodiments use one or more parameters to determine the system condition and/or the host behavior. An example of such a parameter is write amplification. For instance, some embodiments advantageously use a write amplification value to detect one or more system conditions and/or host behaviors such as, for example, the random write pattern. In an implementation, when firmware detects a high write amplification value, data from garbage collection will not be treated as cold data for writes, but is treated similar to host data instead. In these implementations, firmware writes the data from garbage collection to cold blocks. This advantageously prevents the erase count of hot blocks from increasing too fast, and wear-leveling is more efficient, which further improves reliability.

Write Amplification Value:

In an embodiment, write amplification (WA) is a function of over-provisioning. Over-provisioning in particular embodiments allocates (e.g., reserves for the system) a portion of the total flash memory available capacity to the flash storage processor to perform various memory management functions. Over-provisioning leaves less usable capacity to a user, but results in superior performance and endurance. In an example embodiment, a solid state drive (e.g., such as drive 102) has a raw NAND memory capacity of T. In this example, the user can only use part of T and cannot use all of the capacity of the drive 102. Some of the capacity is system reserved such as for over-provisioning and/or garbage collection. In this example, U is the user accessible part of solid state drive (SSD) having a raw total capacity T, and:

$$\text{an over-provisioning factor } X=(T-U)/U.$$

Certain desirable implementations have an over-provisioning factor X in the range of from 7% to 28%, for instance. In an implementation, the over-provisioning factor for the system 100 is pre-determined such as at the time of manufacture and/or is fixed such that it cannot be modified during operation. Continuing with the example, under a full random write condition, the write amplification in steady state is approximated as:

$$\text{write amplification}\approx((1+X)/(2*X)).$$

In an example numerical implementation of this example:

Given $T=1.0$ terabyte (TB), and $U=800$ gigabyte (GB), the over-provision factor $X=(1\text{ TB}-800\text{ GB})/800\text{ GB}=25\%$.

The write amplification in steady state is approximated by:

$$\text{write amplification}\approx((1+25\%)/(2*25\%))=(1.25/0.5)=2.5.$$

In this case, if the write amplification value (WA_value) of the system is greater than 75% of 2.5, then the system comprises a heavy random write condition. For instance, a write amplification value of 2.0 or more is greater than 75% of 2.5, and indicates a heavy random write condition for the case that over-provisioning factor X is about the range of 25% to 28%.

In some of these cases, the "high" write amplification (WA) value of 2.0 or greater indicates that the same valid data has been written multiple times to more than one location such as by garbage collection activities, for example. In these cases, a single write request results in multiple write operations. In another case, a write amplification value of less than 2.0 indicates a garbage collection start condition. In a further case, a write amplification value of about 1.0 indicates a sequential write condition, where one host write request results in one write operation. In view of the foregoing, whether a write amplification factor is "high" is based upon the over-provisioning factor X.

In a further example embodiment, where the over-provisioning factor X is in a lower range such as X less than or equal to 7%, then write amplification value of greater than or equal to eight (e.g., WA_value>=8.0) is considered "high" and thereby indicates a heavy random write condition.

Multiple Write Operations

Most non-volatile memory requires an erase operation prior to writing, or at least benefit from an erase-style operation for improved write performance. Example types of non-volatile memory that are erased prior to writing includes NOR and NAND flash memory. Another type of non-volatile memory that benefits from an erase-style operation for improved write performance includes phase change memory. Non-volatile memory often stores data in block quantities. Generally, non-volatile memory benefits from a process that first pre-erases regions of the memory, and then carries out all writes by absorbing them into the pre-erased regions. When the flash media runs out of pre-erased regions, a garbage collection process is employed to relocate valid blocks and reclaim usable space by erasing a region whose valid blocks have all been relocated elsewhere. In either case, since the same logical block can now reside in potentially different physical locations, the system stores some meta-data information that associates the translation from a logical block to a physical block.

In a block or logical view, application and operating system software view the reading and writing of blocks of data by using a logical address. The flash drive operates with a physical view of the flash media making up physical memory using a physical address. The flash drive reads blocks of data, erases and writes blocks of data at physical memory locations pointed to by the physical address. An application or operating system trying to write to a location in the flash media may not be able to use a physical location as it already has data stored there or a physical location has yet to be erased so a write can occur. Accordingly, a different physical location may be used to store the data into the flash media. Thus, a pointer or translation from logical address to physical address of a flash translation layer also is stored for the flash media so that the application can recall the information that it thought was stored at the logical address. This pointer or translation for a logical address to a physical address is referred to herein as metadata. Metadata points to physical memory locations in the physical memory space.

FIG. 4 illustrates in further detail a process 400 for wear leveling that implements aspects of the foregoing disclosure. As shown in this figure, the process 400 begins at the step 405, where a request to write is received. The process 400 then transitions to step 410.

At step 410, a determination is made whether the write request is in relation to one or more sequential writes. If the write request is relevant to a sequential write then the process 400 transitions to the step 425 where the process determines that the data to be written is hot data such as front end data from the host, for example. Then, the process transitions to the step 440 where the hot data are written to one or more cold blocks.

If at the step 410 a sequential write condition is not detected, then the process 400 transitions to the step 415

At step 415, a determination is made regarding whether garbage collection is heavy. For instance, if the system (e.g., the system 100 of FIG. 1) is at the start of garbage collection, then invalid are most or all of the data within the blocks that the garbage collector initially selects to be emptied or freed for new writes. Moreover, valid data within these selected blocks are likely cold data at the start of garbage collection. Accordingly, when garbage collection is not heavy, the process 400 transitions to the step 435. At step 435, the data from the garbage collection is determined to be cold data. Then the process 400 transitions to the step 445. At step 445, the cold data are written to one or more hot blocks.

If at the step 415, garbage collection is heavy (e.g., the system is running low on resources such as free blocks for writing and/or garbage collection has been running for an extended time and is not near the start of garbage collection, then the process 400 transitions to the step 420.

At step 420, a random write condition is detected. In this case of heavy garbage collection, a (heavy) random write condition is likely, and the process 400 transitions to step 430. At step 430, regardless of source: data from the host, front end data, and/or data from garbage collection, the data are considered hot data. Hence, the process 400 transitions to the step 440. At step 440, the hot data are written to one or more cold blocks.

As shown in FIG. 4, once the data have been written to the appropriate blocks at either step 440 and the step 445, the process 400 concludes.

One of ordinary skill recognizes functional variations to the process 400 of FIG. 4. For instance, in an alternative embodiment, the process 400 decides whether a random write condition is present at a decision node after the step 405 and before the step 410. In these embodiments, the step 415 may not require a decision node and if a random write condition is not present, and a sequential write condition is not present, then the process 400 automatically determines the garbage collection start condition (e.g., garbage collection is not yet heavy) by default.

FIG. 5 illustrates a process 500 in accordance with a specific implementation in further detail. As shown in this figure, the process 500 begins at the step 505, where a request to write data is received. The process 500 then transitions to the step 507.

At step 507, a determination is made whether to data is front end data (e.g., FE data from the host).

If at the step 507, it is determined that the data is front end data, then the process 500 transitions to step 530. At step 530, the data are determined to be hot, and the hot data are written to a cold block at the step 540.

If at the step 507, it is determined that the data is not front end data, then the process 500 transitions to the step 510 and a further analysis is undertaken.

At step 510, a determination is made whether a write amplification value (WA_value) is approximately within a first range. In one embodiment, the range contains a single value of 1.0, for example. If the write amplification value is approximately within the first range (WA_value=1, in this example), then the process 500 transitions to the step 530. At step 530, the data for writing is determined to be hot data such as front end data and/or host data, for example.

In some embodiments, the first range for the write amplification value is used to indicate a particular system condition such as the sequential write condition of FIG. 4, for example. If at the step 510 of FIG. 5, the write amplification value is not within the first range, then the process 500 transitions to the step 515.

At step 515, a determination is made whether the write amplification value is within a second range such as less than about two, for example (e.g., WA_value<2.0). In an example implementation, the second range may correspond to the garbage collection start condition of FIG. 4.

If at the step 515 the write amplification value is within the second range, then the process 500 transitions to the step 535. At step 535, the data is determined to be cold data such as, for example, the data from the start of garbage collection. Then, the process 500 transitions to the step 545. At step 545, the cold data is written to one or more hot blocks.

If at the step 515 the write amplification value is not within the second range, then the process transitions to the step 520. At step 520, the write amplification value is determined to be within a third range.

In an implementation, the third range corresponds to a full and/or true random write condition (e.g., WA_value>=2.0). The third range is illustrated as a default condition at the step 520. However, a decision node may instead occur for the determination regarding the third range at the step 520, and additional decision nodes may occur subsequent to the step 520 to advantageously include additional ranges in alternative embodiments. These additional ranges (e.g., fourth range, fifth range, etc.) may correspond to other conditions for the system 100 of FIG. 1.

Here, as illustrated by the example of FIG. 5, if the write amplification value is not within the first range or within the second range, then by default the write amplification value is within the third range at the step 520, hence the process transitions to the step 530. At step 530, the data is determined to be hot data. After the step 530, the process 500 transitions to the step 540. At step 540, the hot data is written to one or more cold blocks.

As shown in the figure, the process 500 concludes once the data are written to the appropriate blocks at the step 540 and at the step 545. When another write request is received, the process 500 begins again at the step 505.

One of ordinary skill recognizes further variations to the process 500 of FIG. 5. For instance, in alternative embodiments each of the ranges has different numerical values corresponding to different system conditions, in view of the relationship of a provisioning factor X to a detected amount of write amplification.

Figure 6:
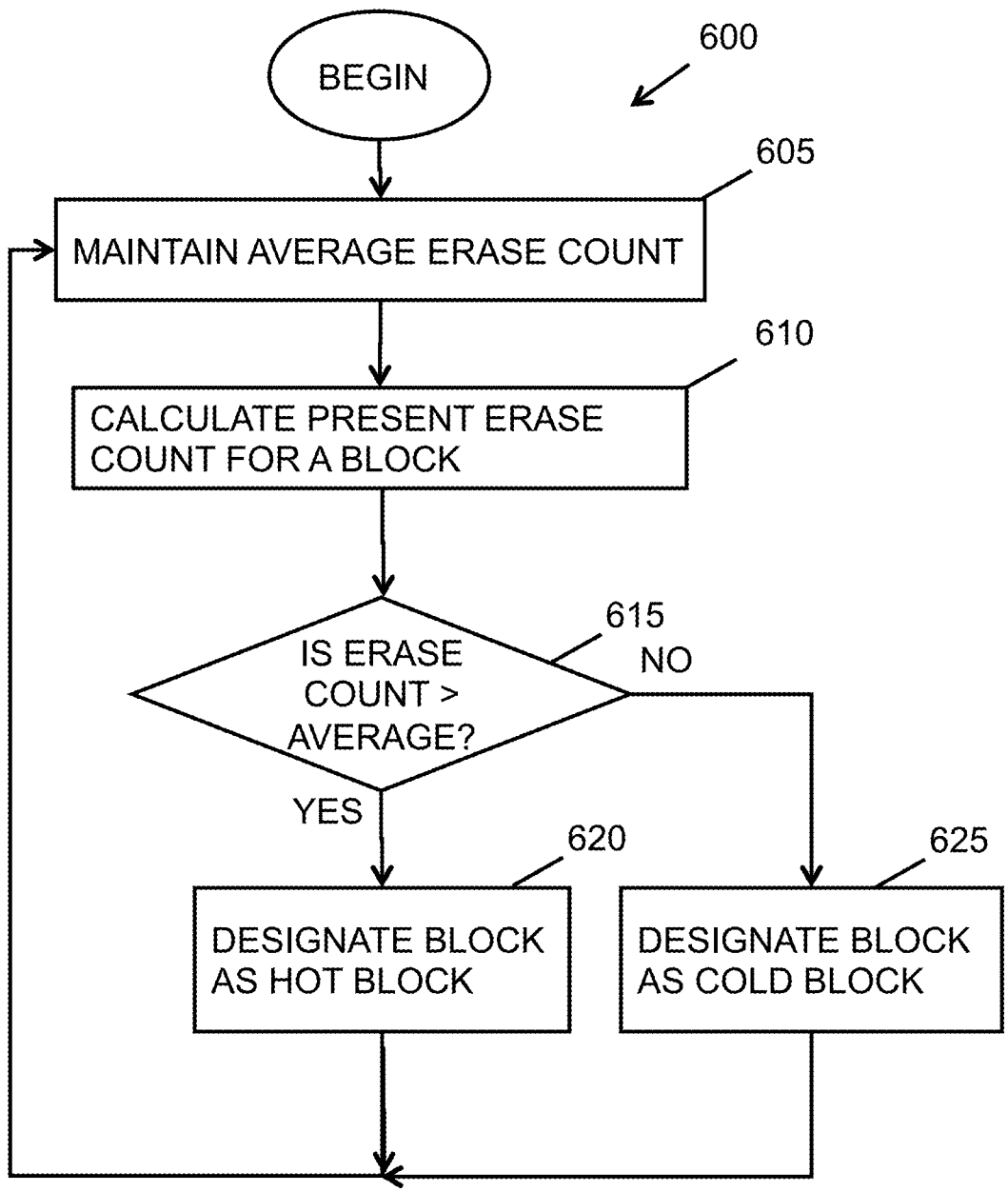
FIG. 6 illustrates a process for identifying hot blocks and cold blocks, according to an embodiment.

FIG. 6 illustrates a process 600 for identifying hot blocks and/or cold blocks. As shown in this figure, the process 600 begins at step 605, where an average erase count is calculated and maintained for a set of blocks. Some embodiments calculate the average erase count for the set of blocks by dividing a sum of the erase count for the set of blocks by the number of blocks within the set. Some of these embodiments store the average erase count as a global variable in RAM during run time. Other erase counts such as total erase count may be calculated and stored at various times. The process 600 then transitions to the step 610.

At step 610, an erase count for a particular block is calculated. In an embodiment, the particular block is within the set of blocks from which the average erase count was calculated. Alternatively, the particular block is not within the set of blocks used to calculate the average erase count. Regardless of whether the particular block is within the set of blocks, the process 600 transitions to the step 615.

At step 615, the erase count for the particular block is compared to the average erase count for the set of blocks.

If the erase count for the particular block is greater than the average erase count, then the process 600 transitions to step 620. At step 620, the particular block is designated as a hot block. Some embodiments add the block that is determined to be hot to a linked-list for hot blocks.

If at step 615, the particular block has an erase count that is lower than the average erase count, then the process 600 transitions to step 625. At step 625, the particular block is designated as a cold block. Some embodiments add the block determined to be cold to a linked-list for cold blocks. Alternatively, or in conjunction with linked-lists, one of ordinary skill recognizes various ways that a block is designated and/or recalled as a hot block or a cold block. Once designated, the hot blocks and/or the cold blocks are available for receiving the appropriate writes of cold data and/or hot data disclosed herein.

After either step 620 and step 625, the process 600 may return to the step 605 to maintain an average erase count such as by calculating and/or recalculating one or more values. Alternatively, the process 600 concludes after the step 620 and the step 625. Advantageously, a hot block and a cold block are written in parallel simultaneously in various embodiments. Alternatively, the hot blocks and the cold blocks are written serially.

Aspects of embodiments of the disclosure are thus described. Aspects of the disclosure may be implemented in a system by using software and/or hardware. For example, a system may include one or more processors that execute instructions of software to implement an aspect of the disclosure. A process may be performed by instructions with a processor.

When implemented in software, the elements of the embodiments are essentially the code segments or instructions to perform the necessary tasks. The program or code segments can be stored in a processor readable medium. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a flash or solid state disk or drive (SSD), or other type of storage device. The code segments or instructions may be remotely stored and downloaded in a data signal via computer networks such as the Internet, Intranet, etc. over a fiber optic medium, a radio frequency (RF) link, or other transmission medium for execution by a processor.

While certain exemplary embodiments have been described and shown in the accompanying drawings, it is to be understood that such embodiments are merely illustrative of and not restrictive on the broad disclosure, and that the embodiments of the disclosure not be limited to the specific constructions and arrangements shown and described, since various other modifications may occur to those ordinarily skilled in the art. The embodiments of the disclosure should be construed according to the claims that follow below.

What is claimed is:

1. A method of wear leveling, the method comprising:
receiving a write request, the write request comprising received data to be written to memory blocks;
detecting a system condition comprising one or more of a random write condition, a garbage collection start condition, and a sequential write condition;
based on the system condition, determining whether the received data comprises hot data or cold data;
if the received data comprises hot data, writing the received data to a cold block;
if the received data comprises cold data, writing the received data to a hot block;
determining a write amplification value for the system;
detecting a random write condition from the write amplification value indicating that a single write request from a host causes a plurality of write operations; and detecting a garbage collection condition when the write amplification value for the system is over a value of 2, wherein hot data is frequently updated by a host and cold data is not frequently updated by the host.

2. The method of claim 1, further comprising:
detecting a sequential write condition such that one write request causes one write operation upon the memory blocks;
determining that the received data for the sequential write comprises hot data.

3. The method of claim 1, further comprising:
detecting a garbage collection start condition such that few memory blocks are available for writing;
determining that the data from a host comprises hot data;
determining that the data from garbage collection comprises cold data;
writing the hot data to a cold block; and
writing the cold data to a hot block.

4. The method of claim 1, further comprising:
detecting a random write condition such that the data from garbage collection includes hot data;
writing the hot data to a cold block.

5. The method of claim 1, the detecting the system condition further comprising:
calculating the write amplification value as a function of an over-provisioning factor, the over-provisioning factor based on a ratio of user accessible memory blocks to total memory blocks.

6. The method of claim 1, further comprising:
determining an erase count for a set of blocks, wherein:
a hot block comprises a block having a high erase count,
a cold block comprises a block having a low erase count; and
selecting a block for writing based on the erase count, thereby providing wear leveling for the set of blocks by distributing the selecting and writing to each block within the set of blocks, wherein a high erase count is defined as an erase count that is above an average erase count for a set of blocks and a low erase count is defined as below the average erase count for the set of blocks.

7. A method of wear leveling, the method comprising:
receiving a write request, the write request comprising received data to be written to memory blocks;
detecting a system condition comprising one or more of a random write condition, a garbage collection start condition, and a sequential write condition;
based on the system condition, determining whether the received data comprises hot data or cold data;
if the received data comprises hot data, writing the received data to a cold block;
if the received data comprises cold data, writing the received data to a hot block wherein hot is data that is frequently updated by a host and cold is data that is not frequently updated by a host;
comparing a write amplification value to a set of predetermined operating ranges for the write amplification value;
detecting a sequential write condition when the write amplification value is within a first range;
detecting a garbage collection start condition when the write amplification value is within a second range; and
detecting a random write condition when the write amplification value is within a third range.

8. A method of wear leveling, the method comprising:
receiving a write request, the write request comprising received data to be written to memory blocks;
detecting a system condition comprising one or more of a random write condition, a garbage collection start condition, and a sequential write condition;
based on the system condition, determining whether the received data comprises hot data or cold data;
if the received data comprises hot data, writing the received data to a cold block;
if the received data comprises cold data, writing the received data to a hot block wherein hot is data that is frequently updated by a host and cold is data that is not frequently updated by a host;
detecting a random write condition from a write amplification value over 8 indicating that a single write request from the host causes a plurality of write operations.

9. A non-transitory computer readable medium comprising sets of instructions thereon which when executed by a processor, the instructions perform the steps of one or more processes for wear leveling, the sets of instructions comprising instructions for:
receiving a write request, the write request comprising received data to be written to memory blocks;
detecting a condition comprising one or more of: a random write condition, a garbage collection start condition, and a sequential write condition;
based on the condition, determining whether the received data comprises hot data or cold data;
if the received data comprises hot data, writing the received data to a cold block;
if the received data comprises cold data, writing the received data to a hot block determining a write amplification value for a system;
detecting a random write condition from the write amplification value indicating that a single write request from a host causes a plurality of write operations; and
detecting a garbage collection condition when the write amplification value for the system is over a value of 2 wherein hot is data that is frequently updated by a host and cold is data that is not frequently updated by a host.

10. The non-transitory computer readable medium of claim 9, the sets of instructions further comprising instructions for:
detecting a sequential write condition such that one write request causes one write operation upon the memory blocks;
determining that the received data for the sequential write comprises hot data.

11. The non-transitory computer readable medium of claim 9, the sets of instructions further comprising instructions for:
detecting a garbage collection start condition such that few memory blocks are available for writing;
determining that the data from the host comprises hot data;
determining that the data from garbage collection comprises cold data;
writing the hot data to a cold block; and
writing the cold data to a hot block.

12. The non-transitory computer readable medium of claim 9, the sets of instructions further comprising instructions for:
detecting a random write condition such that the data from garbage collection includes hot data;
writing the hot data to a cold block.

13. The non-transitory computer readable medium of claim 9, the sets of instructions further comprising instructions for:

calculating the write amplification value as a function of an over-provisioning factor, the over-provisioning factor based on a ratio of user accessible memory blocks to total memory blocks.

14. The non-transitory computer readable medium of claim 9, the sets of instructions further comprising instructions for:

determining an erase count for a set of blocks, wherein:
a hot block comprises a block having a high erase count,
a cold block comprises a block having a low erase count; and
selecting a block for writing based on the erase count, thereby providing wear leveling for the set of blocks by distributing the selecting and writing to each block within the set of blocks wherein a high erase count is defined as an erase count that is above an average erase count for a set of blocks and a low erase count is defined as below the average erase count for the set of blocks.

15. A non-transitory computer readable medium comprising sets of instructions thereon which when executed by a processor, the instructions perform the steps of one or more processes for wear leveling, the sets of instructions comprising instructions for:

receiving a write request, the write request comprising received data to be written to memory blocks;
detecting a condition comprising one or more of: a random write condition, a garbage collection start condition, and a sequential write condition;
based on the condition, determining whether the received data comprises hot data or cold data;
if the received data comprises hot data, writing the received data to a cold block;
if the received data comprises cold data, writing the received data to a hot block wherein hot is data that is frequently updated by a host and cold is data that is not frequently updated by a host, the sets of instructions further comprising instructions for:
comparing a write amplification value to a set of predetermined operating ranges for the write amplification value;
detecting a sequential write condition when the write amplification value is within a first range;
detecting a garbage collection start condition when the write amplification value is within a second range; and
detecting a random write condition when the write amplification value is within a third range.

16. A non-transitory computer readable medium comprising sets of instructions thereon which when executed by a processor, the instructions perform the steps of one or more processes for wear leveling, the sets of instructions comprising instructions for:

receiving a write request, the write request comprising received data to be written to memory blocks;
detecting a condition comprising one or more of: a random write condition, a garbage collection start condition, and a sequential write condition;
based on the condition, determining whether the received data comprises hot data or cold data;
if the received data comprises hot data, writing the received data to a cold block;
if the received data comprises cold data, writing the received data to a hot block wherein hot is data that is frequently updated by a host and cold is data that is not frequently updated by a host, the sets of instructions further comprising instructions for:
detecting a random write condition from a high write amplification value indicating that a single write request causes a plurality of write operations.

* * * * *